May 24, 1955

G. J. GIBSON 2,709,213

METHOD OF HARD SURFACING

Filed April 1, 1952

INVENTOR.
GLENN J. GIBSON
BY
Pennie, Edmonds, Morton, Barrows and Taylor
ATTORNEYS

INVENTOR
GLENN J. GIBSON
ATTORNEYS

United States Patent Office 2,709,213
Patented May 24, 1955

2,709,213

METHOD OF HARD SURFACING

Glenn J. Gibson, Berkeley Heights, N. J., assignor to Air Reduction Company, Incorporated, New York, N. Y., a corporation of New York Application April 1, 1952, Serial No. 279,808

13 Claims. (Cl. 219—10)

This invention relates to the hardfacing of metallic workpieces and structures which are subjected to abrasion in use and more particularly to a method for producing on such workpieces and structures a dispersion of granular particles of hard refractory material in a matrix of the base metal of which the workpiece is made.

Various methods have been proposed heretofore for hardfacing metallic tools such as those made of steel by the application to the surface of such tools of refractory materials such as tungsten carbide. It has been proposed, for example, to employ a hollow steel welding rod containing a core of granular tungsten carbide. This rod is melted down by a heating torch such as an oxy-acetylene torch or an atomic hydrogen torch to form a molten steel matrix containing unfused tungsten carbide granules, which matrix is superficially bonded to the surface to be hardfaced. This process has enjoyed widespread use but is relatively slow.

It has been proposed also to use a similar welding rod as a hardfacing electrode, by striking an arc from the rod directly to the workpiece to be surfaced. The intense and concentrated heat of the direct welding arc not only fuses the steel shell of the welding rod but also a portion of the surface of the workpiece and a substantial proportion of the carbide granules. This process is a rapid one, but the hardness of the facing achieved is reduced below the optimum available with the carbide being employed by virtue of the solution of the melted carbides which occurs in the molten metal from the outer shell of the welding rod and from the workpiece. This solution moreover results in an alloy which is highly crack-sensitive to subsequent heat treating operations which it might otherwise be desirable to perform on the workpiece after such hardfacing, particularly in view of the high temperature of preheating of the workpiece which this process requires.

It has also been proposed to spread on the surface of the workpiece to be hardfaced a layer of carbide particles and to strike a welding arc from the carbide particles to a nonconsuming electrode, preferably inert gas-shielded, in order to fuse the carbide particles as they lie on the workpiece into a carbide veneer bonded to the base metal. While this process is acceptable where surface hardness is the principal requirement, the brittleness of the veneer so produced renders the process unsuitable for applications in which the workpiece is to be subjected to mechanical shock or impact.

The present invention instead provides a high-speed hardfacing method in which hard carbide granules are imbedded in a substantially unfused condition in a matrix of the base metal of the workpiece. The hardfacing so produced is free from crack-sensitiveness to heat treatment, and is tough and resistant to mechanical shock.

In accordance with the present invention, the granular refractory material is introduced into a pool of the molten metal of the workpiece produced by an electric arc which has previously passed over the workpiece to form the pool. The additive carbide particles, which are heavier than the base metal and of higher melting point, sink to the bottom of the pool, and the pool metal freezes around them to produce a tough matrix. While the additive must be exposed as little as possible to the direct action of the arc, it should be introduced into the pool at a very short distance behind the arc in order to find a bed of molten base metal of the proper temperature.

To this end there is employed in the preferred process according to the invention a welding head employing a refractory electrode which is caused to travel over the workpiece in any desired path together with a conduit or nozzle for the supply of the hardfacing material mounted in adjustably fixable position with respect to the welding head so as to introduce a stream of the granular additive material into the pool of molten base metal behind the arc, the nozzle being so adjusted that little or none of the additive is directly exposed to the arc.

By proper positioning and dimensioning of the stream of granular material in accordance with the principles of the invention, the quantity of the additive is so adjusted with respect to the physical dimensions of the pool, the degree of superheat of the pool metal at the point of introduction, and the rate of migration of the pool over the workpiece, that the additive material, which is denser than the workpiece, builds up in a bead-shaped dispersion of particles imbedded in a matrix of the base metal to a level approximating that of the surrounding surface of the workpiece. The base metal so displaced solidifies in a protuberant ridge above the bead of refractory material, which in the preferred practice of the invention lies largely or wholly below the original surface of the workpiece.

A succession of beads can be formed in any desired pattern over the surface of the workpiece to give to the workpiece a suitable resistance to abrasion. If desired, a substantially continuous layer of hardfacing may be formed over the workpiece by repeated passes of the electrode thereover along parallel paths, although care must be taken not to make the paths so close together that the formation of the pool fuses the carbide particles already deposited in the adjacent bead. In use the ridge or ridges of displaced base metal wear off relatively rapidly until the dispersion of refractory particles appears at the exposed surface of the workpiece.

The degree of superheat of the molten base metal at the point of injection of the additive should be sufficient to bring the surface of the additive particles to the (continuously declining) temperature of the molten base metal before the latter freezes, in order that a suitable wetting of the particles with the base metal may be achieved; otherwise they will not be properly bonded and may have difficulty in penetrating the surface of the pool in sufficient amounts. On the other hand the degree of superheat should not be so great as to result in any substantial fusion of the particles of additive.

The invention will now be described in terms of its application to hardfacing of the ends of sections of drill pipe as used in the drilling of oil wells. These sections of drill pipe are connected together in the field by threaded couplings or "tool joints" which may be formed integrally on the ends of the pipe sections or which may be shrunk fit thereon. In either case the couplings are subjected to severe earth and rock abrasion against the walls of the well. Hardfacing of such tool joints in accordance with the invention results in a very substantial increase in their abrasion resistance and useful life. The invention is however applicable to the hardfacing of cylindrical work for whatever purpose as well as to the hardfacing of other shapes. Since however the method depends upon the formation of a pool of metal in the workpiece, it is of primary applicability to work of relatively heavy section in which a suitable pool may be formed without puncturing the section.

In the accompanying drawings:

Fig. 4 is an enlarged sectional view along the line 4—4 of Fig. 2, showing the form of hard surfacing produced.

Figure 1:
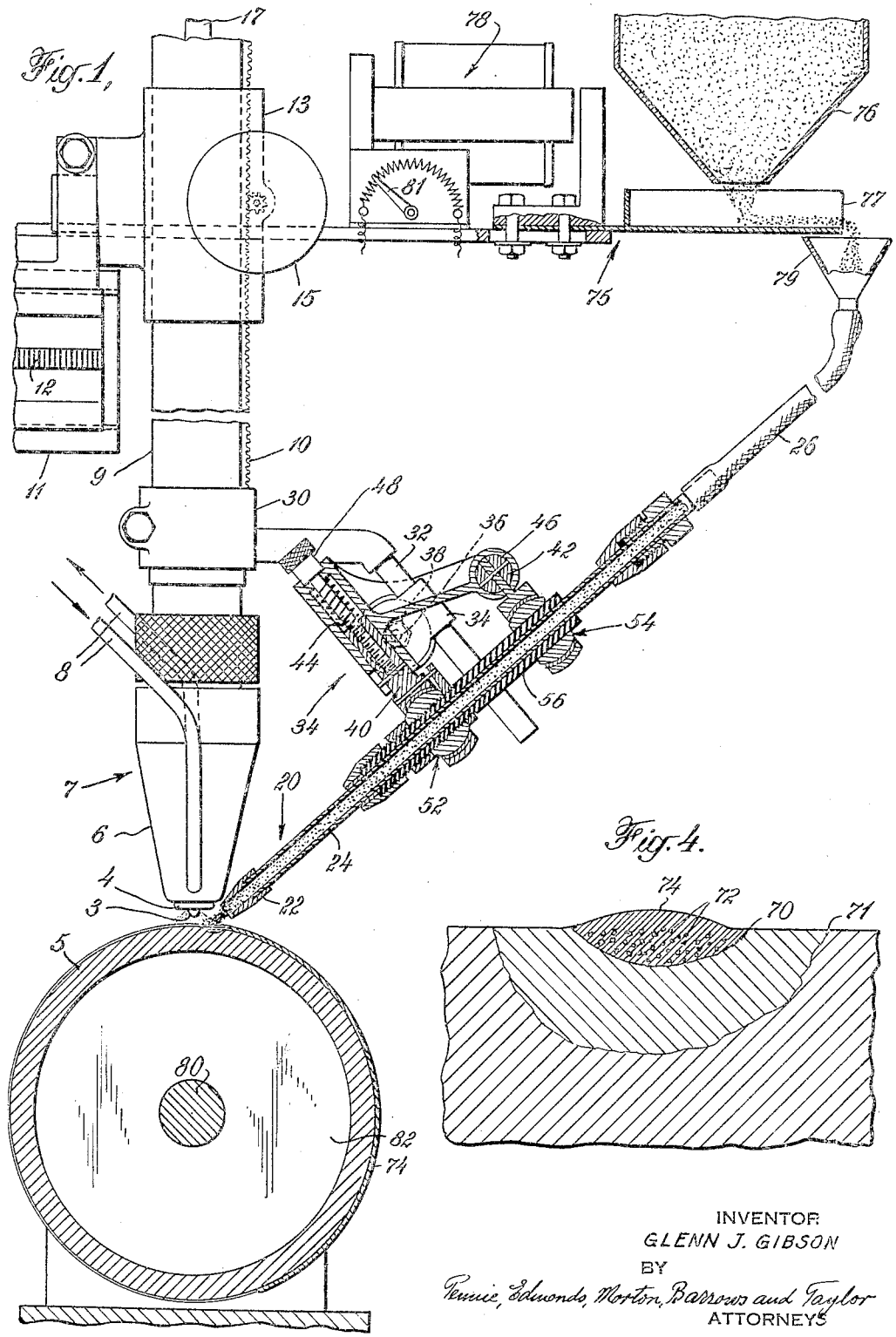
Fig. 1 is a view in elevation, partly sectional, of a form of apparatus which may be employed in forming a hardfacing in accordance with the invention on a cylindrical workpiece such as the tool joint on the end of a section of drill pipe.
Figure 2:
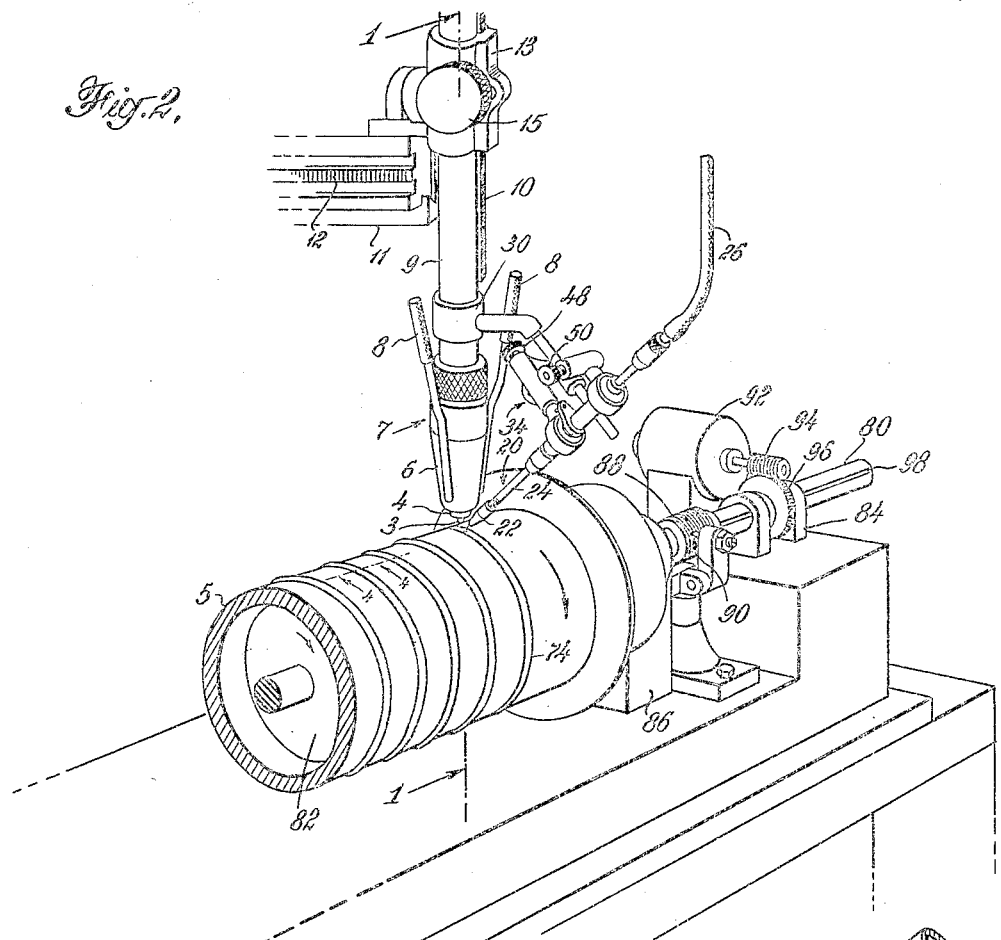
Fig. 2 is a perspective view of the apparatus of Fig. 1 showing mechanism which may be employed for effecting suitable relative motion of the arc and workpiece, only part of the length of the workpiece being shown.

Referring to Figs. 1 and 2, an arc for the practice of the invention is formed between a refractory non-consumable electrode 3 and a workpiece 5, by means of a suitable source of electric current, preferably direct, such as a welding generator, not shown, which is electrically connected to the electrode and to the workpiece. The electrode 3, which may be of thoriated tungsten, is preferably provided as part of a welding head generally indicated at 7. The welding head is positioned at the end of a vertical barrel 9 which depends from a horizontal arm 11. The barrel 9 may be provided with a rack 10 engaging a pinion within the sleeve 13 for vertical adjustment of the welding head and its electrode by means of a control wheel 15. The horizontal arm is supported in a similar sleeve not shown and likewise carries a rack 12 for horizontal adjustment of the welding head crosswise of the workpiece. The welding head is preferably positioned over the center line of the workpiece, which is supported for rotation on a mandrel 80 for rotation by a motor 92 (Fig. 2).

The welding head is preferably of the type which includes provisions for shielding the arc and the surface of the molten pool with an inert gas. For this purpose there is provided coaxially about the electrode 3 a gas nozzle 4, and a stream of shielding gas is sent via a tube 17 down through the barrel 9 and into the welding head where it enters an annular passage between the electrode 3 and nozzle 4 to emerge in an annular stream about the electrode. The shielding gas retards oxidation of the metal in the weld pool. The formation of an oxide or slag on the surface of the pool interferes with proper penetration of the carbide particles below the surface of the pool.

In view of the relatively large currents required for the maintenance of a suitable arc, the welding head may include a water cooling nozzle 6 provided with suitable inlet and outlet connections 8.

The granular refractory material is introduced into the molten puddle on the workpiece in accordance with the invention by means of an adjustable nozzle generally indicated at 20. Tungsten carbide is a suitable additive material, and the nozzle 20 will hereinafter be referred to as the carbide nozzle. It includes a nozzle proper 22 affixed to the end of a short length of rigid tube 24, the upper end of which connects to a flexible conduit 26 leading to the mouth of an adjustable vibratory feeder generally indicated at 75. The feeder includes a hopper or reservoir 76 having an outlet opening into a horizontal trough 77. The trough is coupled to the armature of an electrically operated vibrator 78, and delivers granular material from the reservoir 76 to a funnel 79 at the end of the conduit 26. The rate of feed to the funnel and hence to the workpiece may be varied by adjustment of a control 81 on the amplitude of the vibrations executed by the trough.

Control 81 is shown as a rheostat controlling the voltage applied to the vibrator.

The tube 24 is supported from the vertical barrel 9 by a positioning device which permits closely controlled adjustment of the position of the carbide nozzle 22 with respect to the electrode 3 and welding head both laterally and longitudinally of the path of relative motion between the welding head and the surface of the workpiece. A collar 30 clamps around the vertical barrel 9 and supports a clamping rod 32 which extends downwardly and outwardly from the vertical axis of motion of the welding head in sleeve 13.

A bracket generally indicated at 34 is fixable at any point along rod 32 and in any angular position about the axis of rod 32 as well as about an axis perpendicular to the length of rod 32 by means of the bolt 36 and nut 38. Bracket 34 supports pistons 40 and 42 in separate perpendicular bores 44 and 46 formed in bracket 34. The pistons are moved within their cylinders by means of screws 48 and 50 (Fig. 2). Pistons 40 and 42 are respectively affixed to ball and socket joints generally indicated at 52 and 54 which support tube 24 via a sleeve 56, preferably of insulating material. Tube 24 is adjustably fixable lengthwise within tube 56, and tube 56 may be fixed within the ball of joint 52, whereas it slides within the ball of joint 54.

By means of this mechanism the nozzle 22 may be adjusted to any desired position relative to the electrode 3 and to the arc which is produced thereby. Accordingly the stream of carbide material issuing from the nozzle 22 can be brought to impinge at any desired point on the pool of molten metal formed in the workpiece.

When the screw 48 is adjusted, the carbide nozzle 22 moves through an arc about the center of the socket member 54 in the vertical plane of Fig. 1. When the screw 50 is adjusted, the carbide nozzle moves in an arc about the center of the socket member 52 in a plane perpendicular to the plane of Fig. 1. By means of these separate motions the point of impact of the stream of carbide material issuing from the nozzle 22 can be adjusted as desired over the surface of the workpiece in the vicinity of the arc.

The form of adjustable positioning device shown in the drawings is disclosed and claimed in U. S. Patent No. 2,681,401 assigned to the assignee hereof. Other positioning devices may however be used in the practice of the invention.

Hardfacing according to the invention requires the generation of a very large amount of heat at the workpiece in order to form a pool of adequate size. This may be advantageously achieved by operating the arc with direct current at "straight polarity" in which the electrode is negative and the workpiece positive, and by employing helium as the shielding gas.

In the practice of the invention the arc is established between the electrode and the workpiece in any desired way, as by "brushing" a carbon between the electrode and the workpiece, or by the use of a high frequency A. C. voltage or otherwise. The arc must be of sufficient power to create on the workpiece a pool of molten metal from the workpiece, and to maintain this pool about the end of the arc in contact with the workpiece as the arc is moved over it. For satisfactory operation, especially with workpieces of heavy section, the workpiece is preferably preheated to a temperature substantially above room temperature. This preheating not only retards undesirable hardening of the workpiece due to unduly rapid cooling after the arc has passed but facilitates the maintenance of a pool of adequate size. The preheating may be effected in any one of various ways known to the welding art.

The arc once established is moved over the work at a speed slow enough to permit maintenance of a pool about it, by effecting relative movement of the workpiece and electrode. In the case of a cylindrical workpiece, this is most readily achieved by rotating the workpiece while maintaining the electrode in a fixed position over the center line of the workpiece, as shown in the drawings. For stability of the arc the workpiece and electrode should be maintained at substantially constant separation. The carbide additive is then injected into the pool immediately behind the arc, preferably in the exact center of the pool.

With a given arc voltage and current, degree of preheat (if necessary) and speed of the workpiece relative to the arc, all chosen to produce under steady state conditions of operation a pool of adequate size and depth, the carbide nozzle is adjusted to direct the stream of carbide into the pool as close to the arc as is practical without passing through it and in the middle of the pool as regards its width, and the rate of flow of the carbide material is adjusted to the maximum which the pool will accept.

In adjusting the position of the carbide nozzle, it is important to avoid impingement of the carbide material on the electrode, since this will result in contamination of the electrode and its fusion or destruction. To prevent such contamination a preliminary adjustment of the position of the carbide nozzle may be made with the arc off. In operation the position of the carbide stream crosswise of the relative path of motion between the arc and the workpiece may require occasional adjustment, especially near the ends of a workpiece in order to compensate for "arc blow" due to changes in the configuration of the magnetic field about the arc in response to changes of the current path through the workpiece. If, lengthwise of the pool, the stream of carbide impinges too close to the arc, excessive fusion of the carbide material will result. It is however desirable to inject the stream of carbide material into the pool close behind the arc, substantially at the center of the pool. If the point of injection is too far back, the apparent capacity of the pool to accept carbides will be low. A relatively small number of granules will penetrate the surface and sink to the bottom. Any additional granules supplied will remain on the surface, forming a relatively friable crust. With only a few granules at the bottom of the fusion zone, the hardfacing is evidently relatively poor. After the surface granules are worn or broken off, the larger part of the depth of the pool must be worn off the tool before any more hard material is brought into action in resisting wear. Apparently, as the temperature of the molten metal at the point of injection declines, the facility with which the particles penetrate it declines also, possibly as a result of increased surface tension. If instead, in accordance with the preferred practice of the invention, the stream is directed onto the pool immediately behind the arc and not back close to the congealing end of the pool, enough granules will penetrate the surface to build up from the bottom to the vicinity of the original surface of the workpiece.

The limit of the capacity of the pool to absorb the granular material is indicated by the accumulation on the surface thereof of carbide particles which fail to penetrate the surface. The stream of carbide should be so directed as to impinge on the pool in the region of its maximum depth and fluidity, i. e. at the center thereof.

Figure 3:
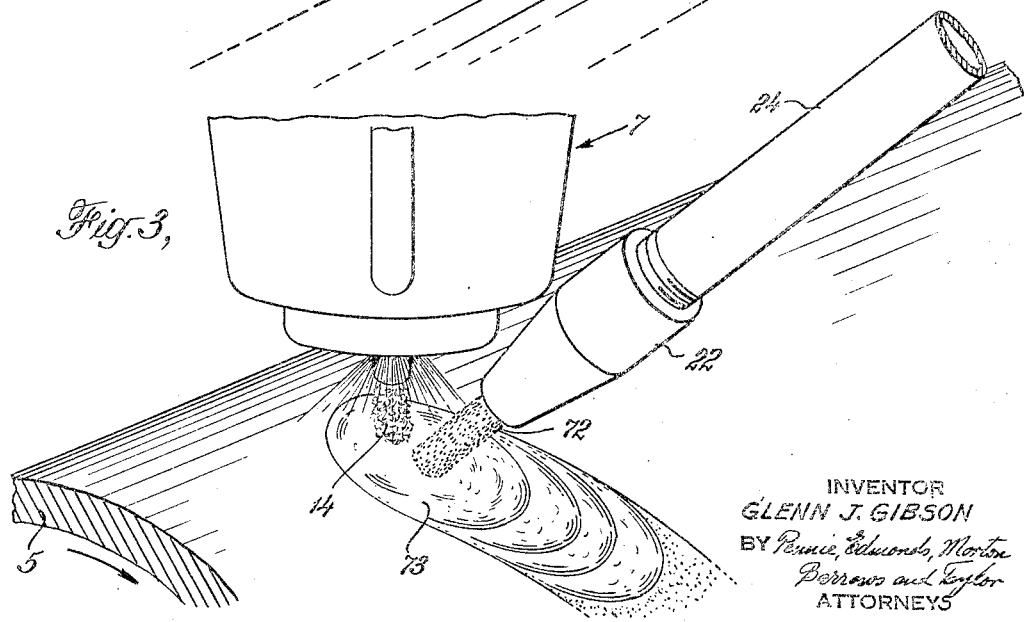
Fig. 3 is an enlarged view of a portion of Fig. 2, illustrating the continuous formation and migration of the weld pool and the introduction thereinto of the hardfacing material.

In the enlarged perspective view of Fig. 3, the stream of carbide particles 72 is seen to be directed into the pool 73 immediately behind the central column 14 of the arc. As seen in Figs. 1–3 the workpiece rotates counterclockwise, and the stream of carbide accordingly advances over the work behind the arc.

Fig. 4 is an enlarged sectional view through the bead of hardfacing produced by a single pass of the arc over the workpiece. The sectional view of Fig. 4 is obtained by sawing through the workpiece around the bead of hardfacing, and then by fracturing the bead and grinding or polishing the fractured surface. The surface may also be etched to improve the contrast between the particles and the background of the matrix surrounding them.

The line 70 represents the limit of the fusion zone in the workpiece produced by the arc, and the line 71 similarly represents the limit of the heat affected zone. Carbide granules 72 are seen to be dispersed over the cross section of the fusion zone up to the vicinity of the surrounding surface of the workpiece, whereas the displaced metal freezes into a protuberant ridge at 74. It is seen from Fig. 4 that the particles retain their angular outline; they have not been melted in the process of their application to the workpiece. On the other hand, examination of such a section at large magnification shows good alloying of a very thin surface layer of the granules with the matrix as a result of the superheated state of the matrix metal upon injection of the carbide particles into it.

By way of example only it may be stated that the invention may be practiced on a steel tool joint approximately 5 inches in diameter and approximately 1 inch in wall thickness with an arc about ¼ inch long run at some 17 volts straight polarity and some 300 amperes to produce a weld pool of the order of ⅝ inch wide by 1¼ inches long with a relative motion of the arc and workpiece at a speed of some 15 inches per minute, the workpiece being preheated to some 400 to 500° F.

Under these conditions a carbide feed of the order of 65 grams per minute can be employed. Under these operating conditions a bead of hardfacing approximately ½ inch wide and of an average depth below the surface of the workpiece of the order of ⅛ inch may be produced.

The magnitude of the carbide particles may vary over a substantial range. For example the invention has been successfully practiced with carbide granules of between 30 and 40 mesh and of between 40 and 120 mesh.

For the production on a workpiece of a plurality of beads, the workpiece may be advanced either continuously or intermittently in a second direction with respect to the arc. Thus with cylindrical work, the workpiece may be moved axially once per revolution or it may be moved axially synchronously with its rotational motion to form a helical bead. Fig. 2 illustrates the formation of a plurality of circular ring-shaped beads. For this purpose the mandrel 80 which supports the workpiece as by means of disks 82 is in turn supported in bearings 84 and 86. A worm 88 with a series of separate zero pitch threads is pinned to the mandrel for separate engagement of its threads with a pin 90 fixed in axial position with respect to the bearings which support the mandrel. The driving motor 92 is coupled to the mandrel by means of a worm 94 and a worm wheel 96, the latter engaging the mandrel at a spline 98. The pin 90 is spring loaded against the worm and upon the completion of each circular bead may be retracted to permit axial motion of the workpiece to a new position.

While in the preferred practice of the invention the carbide additive is injected so as to be seized by the matrix below the old surface of the workpiece, the invention comprises generally the injection of particles of refractory material behind the arc into a pool of molten metal formed on a workpiece by an arc. While the practice of the invention has been described herein in terms of a preferred procedure, variations may be made within the scope of the invention as set forth in the appended claims. It is of course immaterial whether initially the arc is established before the relative motion of the electrode and workpiece is begun or vice versa.

The invention has been described herein with reference to the use of tungsten carbide as the granular refractory material. The method of the invention can however be practiced with other refractory materials, in particular with the carbides of tantalum, titanium, tungsten, columbium and boron and with mixtures of these carbides.

I claim:

1. The method of hardfacing a metallic workpiece which comprises establishing between an electrode and the workpiece an arc of sufficient power to form a pool of molten metal on the workpiece, moving the arc over the workpiece, and introducing particles of refractory material behind the arc into the pool of molten metal produced by the arc on the workpiece.

2. The method of hardfacing a metallic workpiece which comprises establishing between an electrode and the workpiece a gas shielded arc of sufficient power to form a pool of molten metal on the workpiece, moving the arc over the workpiece, and introducing into the pool of molten metal behind the arc a stream of granular refractory material.

3. The method of hardfacing a metallic workpiece which comprises establishing between the workpiece and an electrode an arc of sufficient intensity to form about the end of the arc on the workpiece a molten pool of the metal of the workpiece, effecting relative movement of the electrode and workpiece, and injecting into the pool behind the arc a metered quantity of refractory material.

4. The method of hardfacing a metallic workpiece which comprises moving an electrode over the surface of the workpiece at substantially constant speed and distance therefrom, establishing a direct current arc between the electrode and workpiece of sufficient power to maintain on the workpiece about the end of the arc in contact therewith a pool of molten metal at least a part of which is heated above its fusion temperature, and introducing into the pool behind the arc a stream of particles of refractory material at a controlled rate.

5. The method of hardfacing a metallic workpiece which comprises moving an electrode over the surface of the workpiece at substantially constant speed and distance therefrom, establishing a direct current arc between the electrode and workpiece of sufficient power to maintain on the workpiece about the end of the arc in contact therewith a pool of molten metal from the workpiece at least a part of which is heated above its fusion temperature, and introducing particles of refractory material of higher melting point than the workpiece into the pool behind the arc at a rate substantially equal to the maximum rate of flow which will penetrate the surface of the pool.

6. The method of hardfacing a metallic workpiece which comprises moving an electrode over the surface of the workpiece at a substantially constant separation therefrom, establishing between the electrode and workpiece an inert gas shielded direct current arc of sufficient power to form about the end of the arc in contact with the workpiece a pool of molten metal of the workpiece, and introducing particles of refractory material at a controlled rate into said pool at a fixed distance behind the arc.

7. The method of hardfacing a metallic workpiece which comprises moving an electrode over the surface of the workpiece at a substantially constant separation therefrom, establishing between the electrode as negative terminal and the workpiece as positive terminal an inert gas shielded direct current arc of sufficient power to form about the end of the arc in contact with the workpiece a pool of molten metal of the workpiece, and introducing particles of refractory material at a controlled rate into said pool at a fixed distance behind the arc.

8. The method of forming on a metallic workpiece a dispersion of carbide particles in a matrix of the base metal of the workpiece which comprises advancing an arc over the workpiece to form a pool of molten metal moving over the workpiece with the arc, and injecting a metered quantity of carbide particles into the pool behind the arc.

9. The method of forming in a metallic workpiece a dispersion of particles of refractory material of greater density and higher melting point than the metal of said workpiece which comprises advancing an arc over the workpiece to form at the successive positions of the arc a pool of molten metal from the workpiece, and injecting particles of said material into the pool behind the arc at a controlled rate.

10. The method of hardfacing a metallic workpiece with particles of refractory material of greater specific gravity and of higher melting point than said workpiece which comprises establishing an arc between an electrode and the workpiece to form on the workpiece a pool of molten metal, moving the arc slowly over the workpiece, and injecting a metered quantity of said material into the pool behind the arc.

11. The method of producing below the surface of a steel workpiece a dispersion of tungsten carbide particles in a matrix of the metal of the workpiece which comprises establishing an inert gas shielded arc of straight polarity between a refractory electrode and the workpiece to form on the workpiece a pool of superheated molten metal therefrom, moving the arc over the workpiece, and introducing into the pool behind the arc a stream of granular tungsten carbide at such a rate as substantially to fill the pool to the unmelted surface level of the workpiece.

12. The method of producing in a metallic workpiece a dispersion of carbide particles imbedded in the metal of the workpiece which comprises establishing an inert gas shielded arc of straight polarity between the workpiece and a refractory electrode to form on the surface of the workpiece a pool of superheated metal from the workpiece, effecting relative movement of the electrode and workpiece while maintaining substantially constant separations therebetween, and delivering to the pool behind the electrode a stream of granular carbide material proportioned to the dimensions of the pool and its degree of superheat to bring the surface of the particles of said material substantially to the temperature of the molten metal in the pool before the latter freezes, without substantial fusion of said particles.

13. The method of forming in the surface of a metallic workpiece a bead of carbide particles imbedded in the metal of the workpiece which comprises establishing between the workpiece and a non-consumable electrode an inert gas shielded arc of straight polarity of sufficient power to form on the surface of the workpiece a pool of superheated metal from the workpiece, effecting relative movement of the electrode and workpiece while maintaining a substantially constant separation therebetween, and delivering to the pool behind the arc in the region of maximum depth of the pool a stream of granulated carbide material proportioned to the dimensions of the pool and its degree of superheat to penetrate the surface of the pool and to displace the molten metal in the pool up to a level substantially equal to the surface of the workpiece.

References Cited in the file of this patent

UNITED STATES PATENTS

| | | |
|---|---|---|
| 2,151,914 | Hopkins | Mar. 28, 1939 |
| 2,354,113 | Gould | July 18, 1944 |
| 2,427,350 | Carpenter | Sept. 16, 1947 |
| 2,442,087 | Kennedy | May 25, 1948 |